United States Patent
Ueki et al.

(10) Patent No.: US 10,136,338 B2
(45) Date of Patent: Nov. 20, 2018

(54) WIRELESS COMMUNICATION CONTROL SYSTEM, WIRELESS COMMUNICATION CONTROL APPARATUS, METHOD FOR CONTROLLING WIRELESS COMMUNICATION, AND METHOD FOR PRODUCING DIRECTIVITY INFORMATION

(71) Applicant: OMRON Corporation, Kyoto-shi, Kyoto (JP)

(72) Inventors: Daichi Ueki, Kyoto (JP); Keisuke Saito, Suita (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/545,144

(22) PCT Filed: Feb. 2, 2016

(86) PCT No.: PCT/JP2016/053017
§ 371 (c)(1),
(2) Date: Jul. 20, 2017

(87) PCT Pub. No.: WO2016/129448
PCT Pub. Date: Aug. 18, 2016

(65) Prior Publication Data
US 2018/0288628 A1 Oct. 4, 2018

(30) Foreign Application Priority Data
Feb. 13, 2015 (JP) ................. 2015-026974

(51) Int. Cl.
*H04W 4/00* (2018.01)
*H04W 16/28* (2009.01)
*H01Q 3/30* (2006.01)

(52) U.S. Cl.
CPC ............ *H04W 16/28* (2013.01); *H01Q 3/30* (2013.01)

(58) Field of Classification Search
CPC ................. H04W 16/28; H04Q 3/30
(Continued)

(56) References Cited

U.S. PATENT DOCUMENTS

| | | | | | |
|---|---|---|---|---|---|
| 3,922,685 | A | * | 11/1975 | Opas | H01Q 3/34 342/372 |
| 6,016,457 | A | * | 1/2000 | Toukura | B60W 10/06 180/167 |

(Continued)

FOREIGN PATENT DOCUMENTS

| | | |
|---|---|---|
| JP | 2001-267991 A | 9/2001 |
| JP | 2002-094448 A | 3/2002 |

(Continued)

OTHER PUBLICATIONS

English translation of Written Opinion of PCT/JP2016/053017 dated Apr. 26, 2016 from the International Searching Authority.
(Continued)

*Primary Examiner* — Thai D Hoang
(74) *Attorney, Agent, or Firm* — Metrolexis Law Group, PLLC (57) ABSTRACT

Provided is a wireless communication control system including a control apparatus that controls driving of one or more driving devices in accordance with a plurality of predetermined driving patterns, a first radio having a directional antenna, and a second radio. Target driving directivity information corresponding to a target driving pattern acquired by an acquisition unit is selected from among pieces of driving directivity information relating to a directivity applied to the directional antenna in a state in which driving of the one or more driving devices is controlled by the control apparatus in accordance with the plurality of driving patterns, the selected target driving directivity information is applied to the directional antenna of the first radio,
(Continued)

and wireless communication between the first radio and the second radio is executed.

13 Claims, 7 Drawing Sheets

(58) Field of Classification Search
USPC .................. 370/328–329, 312, 335–348
See application file for complete search history.

(56) References Cited

U.S. PATENT DOCUMENTS

| | | | |
|---|---|---|---|
| 6,163,277 A * | 12/2000 | Gehlot | G08G 1/052 340/539.1 |
| 7,805,240 B2 * | 9/2010 | Naitou | G01C 21/12 340/438 |
| 2002/0034967 A1 | 3/2002 | Taniguchi et al. | |
| 2002/0121981 A1 * | 9/2002 | Munch | G08B 21/06 340/576 |
| 2003/0142756 A1 | 7/2003 | Kohno et al. | |
| 2005/0192721 A1 | 9/2005 | Jouppi | |
| 2007/0179711 A1 * | 8/2007 | Tobiyama | G01C 21/3679 701/426 |
| 2010/0248659 A1 | 9/2010 | Kawabata | |
| 2013/0049987 A1 * | 2/2013 | Velusamy | G08G 1/0112 340/905 |
| 2013/0297069 A1 | 11/2013 | Tachiwa | |
| 2014/0024323 A1 | 1/2014 | Clevorn et al. | |
| 2017/0317700 A1 * | 11/2017 | Ueki | H04B 1/0475 |
| 2017/0325072 A1 * | 11/2017 | Ueki | H04B 7/10 |
| 2018/0006508 A1 * | 1/2018 | Ueki | H04B 7/10 |

FOREIGN PATENT DOCUMENTS

| | | |
|---|---|---|
| JP | 2013-230534 A | 11/2013 |
| JP | 2014-225764 A | 12/2014 |

OTHER PUBLICATIONS

The International Search Report of PCT/JP2016/053017 dated Apr. 26, 2016.
The partial supplementary European search report dated Feb. 5, 2018 in a counterpart European Patent application.
The extended European search report (EESR) dated May 2, 2018 in a counterpart European Patent application.

* cited by examiner

|  | Driving content | Driving directivity information |
|---|---|---|
| Driving Pattern 1 | robot 3a: operation A1<br>robot 3b: operation B1<br>motor: stop | S1 |
| Driving Pattern 2 | robot 3a: operation A2<br>robot 3b: operation B2<br>motor: operation C2 | S2 |
| Driving Pattern 3 | robot 3a: stop<br>robot 3b: operation B3<br>motor: operation C3 | S3 |

FIG. 7

WIRELESS COMMUNICATION CONTROL SYSTEM, WIRELESS COMMUNICATION CONTROL APPARATUS, METHOD FOR CONTROLLING WIRELESS COMMUNICATION, AND METHOD FOR PRODUCING DIRECTIVITY INFORMATION

TECHNICAL FIELD

The present invention relates to a wireless communication control system for controlling wireless communication between a first radio having a directional antenna and a second radio performing wireless communication therewith.

RELATED ART

Conventionally known is technology in which with regard to wireless communication between a mobile terminal such as a mobile phone and a wireless base station, a directional adaptive array antenna is utilized in the wireless base station. The adaptive array antenna is constituted by a plurality of antenna elements that are spaced apart from each other and can emit a plurality of beams in any direction at any width by controlling these antenna elements. Accordingly, suitable wireless communication can be realized. For example, according to the technology disclosed in Patent Document 1, the movement of a user of a mobile terminal is predicted, and the directivity of the adaptive antenna is controlled based on the result of this prediction.

RELATED ART DOCUMENTS

Patent Documents

Patent Document 1: JP 2002-94448A

SUMMARY OF THE INVENTION

Problem to be Solved by the Invention

In recent years, in the field of FA (factory automation) as well, there is an increasing tendency for wireless communication to be used for the transfer of a control signal to a driving device by a control apparatus or the transfer of measurement data measured by various sensors to a control apparatus for collection, for example. Conventionally, cable communication has been widely used for these signals and data in consideration of the stability of communication. However, if cable communication is used, there is a significant limitation on the design of the manufacturing line because the position of a radio is fixed. In view of this, it is thought that utilizing wireless communication not only increases the degree of freedom of the design of the manufacturing line but also increases the maintainability of the manufacturing line and a manufacturing apparatus due to elimination of a transfer cable.

On the other hand, wireless communication for transferring a control signal, measurement data, and the like tends to be influenced by external disturbance, in particular, influenced by fading due to the influence of an active object that is present between radios. In the field of FA, the space between radios varies due to a driving device such as an arm of a manufacturing robot being driven in the space in which wireless communication is performed between radios, or the radio being disposed on a moving object, and an environment in which fading tends to occur is formed due to various objects going in and out the space. In such an environment in which fading tends to occur, it is preferable to use a communication antenna having directivity such as a phased-array antenna for the stability of wireless communication, but even if such an antenna is utilized, it is difficult to maintain suitable wireless communication due to the influence of fading caused by motion of an object in the space between radios.

The present invention was made to solve such problems, and an object of the present invention is to provide technology for suppressing the influence of fading between radios as much as possible while utilizing a directional antenna, and suitably performing wireless communication between radios.

Means for Solving the Problems

In order to resolve the above-described issues, the present invention focused on the fact that control of the driving of one or more driving devices by a control apparatus tends to follow predetermined driving patterns in the FA field. That is, the inventor of the invention thought that if the pattern for controlling the driving of the driving device that causes fading is determined in advance, the situation in which such fading occurs can be also understood to some extent in advance, and it is possible to keep wireless communication between radios in a suitable state by controlling the directivity of the directional antenna in accordance with the situation.

Specifically, a wireless control system according to the present invention includes a control apparatus that controls driving of one or more driving devices in accordance with a plurality of predetermined driving patterns, a first radio having a directional antenna, a second radio formed to be capable of performing wireless communication with the first radio, a directivity information storage unit that stores driving directivity information relating to a directivity, the driving directivity information being applied to the directional antenna of the first radio in relation to wireless communication between the first radio and the second radio in accordance with the plurality of driving patterns in a state in which driving of the one or more driving devices is controlled by the control apparatus in accordance with the plurality of driving patterns, an acquisition unit that acquires, from the control apparatus, a target driving pattern that is the driving pattern among the plurality of driving patterns that the control apparatus applies to the one or more driving devices, and an execution unit that selects, from among pieces of the driving directivity information stored in the directivity information storage unit, target driving directivity information corresponding to the target driving pattern acquired by the acquisition unit, applies the selected target driving directivity information to the directional antenna of the first radio, and executes wireless communication between the first radio and the second radio.

The wireless communication control system according to the present invention is a system that performs control relating to wireless communication between a first radio having a directional antenna and a second radio formed to be capable of performing wireless communication therewith. An antenna that can control various directivities according to a conventional technique can be adopted as the directional antenna, and for example, a phased-array antenna is an exemplary example of the directional antenna. In such a directional antenna, the intensity of radio wave emission and the sensitivity of radio wave reception increase in a specific direction, but it is difficult to perform suitable wireless communication in directions other than the specific direction, compared to an omnidirectional antenna. In view of this, in order to realize suitable wireless communication between the first radio and the second radio, the directivity of a directional antenna of the first radio is controlled.

A control apparatus that is electrically connected to the first radio is an apparatus that controls driving of one or more driving devices, and the driving control is performed in accordance with a plurality of pre-set driving patterns. Thus, if the control apparatus controls the driving of a driving device with use of the driving patterns, the first radio and the second radio perform wireless communication in an environment in which the driving of this driving device is controlled in accordance with these driving patterns. As a result, fading caused by the driving patterns acts on the wireless communication between the first radio and the second radio.

Here, the plurality of driving patterns for the control apparatus utilizing the driving device are determined in advance, and thus it is thought that fading caused by the driving patterns has reproducibility to some extent. Thus, it is thought that the effect of the fading on the wireless communication between the first radio and the second radio also significantly depends on the driving pattern executed by the control apparatus. In view of this, a directivity information storage unit stores, in accordance with driving patterns, driving directivity information that can be applied to a directional antenna and is set in consideration of falling caused by a driving pattern in a state in which the driving of the driving device is controlled by the control apparatus in accordance with the driving patterns (also referred to as "pattern driving control state"), the driving directivity information making it possible to perform suitable wireless communication between the first radio and the second radio.

That is, focus is placed on the fact that the content of controlling driving of a driving device by a control apparatus follows a predetermined driving pattern, and the directivity information storage unit stores driving directivity information that is applied to the directional antenna corresponding to that driving pattern. In other words, this means that the directivity information storage unit stores, for each driving pattern, driving directivity information, which is information relating to the directivity for suitably performing wireless communication between the first radio and the second radio, as long as the control apparatus controls the driving of the driving device in accordance with the driving patterns. This driving directivity information can be obtained by preliminarily experimentally controlling the driving of a driving device in accordance with a driving pattern when this driving pattern is determined.

In view of this, the acquisition unit acquires a target driving pattern, which is the driving pattern performed at that point in time in the pattern driving control state. Note that an electrical connection state via a cable or wirelessly is preferably formed between the first radio and the control apparatus. The execution unit selects, from pieces of the driving directivity information stored in the directivity information storage unit, target driving directivity information, which is driving directivity information corresponding to the target driving pattern, and applies the selected driving directivity information to wireless communication between the first radio and the second radio in that pattern driving control state. As a result, the influence of fading occurring in this pattern driving control state on wireless communication between radios can be suppressed as much as possible, and accordingly suitable wireless communication can be realized.

Note that the driving directivity information stored in the directivity information storage unit includes at least one of directivity information corresponding to the direction of wireless communication in which the first radio performs transmission and the second radio performs reception, and directivity information corresponding to the direction of wireless communication in which the second radio performs transmission and the first radio performs reception. Also, the direction of wireless communication relating to the target driving directivity information selected by the execution unit preferably coincides with the direction of wireless communication between radios when this information is applied. However, if fading that acts on wireless communication between radios in the direction of wireless communication in which the first radio performs transmission and the second radio performs reception and the direction of wireless communication in which the second radio performs transmission and the first radio performs reception, shared target driving directivity information may be applied to both directions of wireless communication.

Here, in the above-described wireless communication control system, the acquisition unit may acquire, in addition to the target driving pattern, information relating to an execution time at which the target driving pattern is executed in the one or more driving devices by the control apparatus, and the execution unit may execute wireless communication with the second radio based on the execution time via the directional antenna of the first radio to which the target driving directivity information is applied. As a result of the acquisition unit further acquiring information relating to execution time in this manner, in wireless communication performed by the execution unit with the second radio via the first radio to which the target driving directivity information is applied, wireless communication is performed after appropriately applying directivity information required for suitable wireless communication to the directional antenna, and thus wireless communication between radios can be made more suitable.

Also, in the above-described wireless communication control system, the target driving directivity information may be information relating to a directivity that is applied to the directional antenna of the first radio, the directivity being set such that a received signal received by a reception radio out of the first radio and the second radio has a maximum intensity or is in a predetermined received signal intensity range at a plurality of control times that are set in an execution period during which the target driving pattern is executed. Note that this predetermined received signal intensity range refers to a range of received signal intensity required to realize suitable wireless communication between the first radio and the second radio. Thus, by setting the target driving directivity information in this manner, in wireless communication between the first radio and the second radio using the directional antenna to which the target driving directivity information is applied by the execution unit, the received signal intensity required for suitable wireless communication is secured.

Also, in the above-described wireless communication control system, the second radio may be disposed on the driving device whose driving is controlled by the control apparatus, and a relative position of the second radio with respect to the first radio may change due to the driving device being moved in accordance with the target driving pattern, In this case, the target driving directivity information is produced in a situation in which the relative position of the second radio with respect to the first radio changes. In this manner, the second radio is the driving device whose driving is controlled by the control apparatus, that is, in a mode in which the second radio is disposed on the driving device whose driving is controlled in accordance with a driving pattern, the space between the first radio and the second radio tends to vary depending on the driving pattern and wireless communication between the two radios tends to be influenced by fading. On the other hand, suitable information transfer can be realized by disposing the second radio that performs wireless communication instead of cable communication, on the driving device whose driving is controlled in this manner. Therefore, it is possible to suitably apply the invention of this application to this mode and realize suitable information transfer via wireless communication.

Meanwhile, the invention of this application does not exclude a mode in which the positions of the first radio and the second radio do not change relative to each other in the above-described wireless control system. Even in the mode in which radios do not move in this manner, fading sometimes acts on wireless communication between radios due to the driving of a driving device being controlled in accordance with a driving pattern near the radios, and thus suitable wireless communication can be realized as described above by applying the invention of this application thereto.

Also, the above-described wireless communication control system may include a plurality of the second radios. If a plurality of second radios are included in this manner, the following two aspects are examples of the wireless communication control system according to the present invention. As a first aspect, the plurality of second radios are each configured to be capable of alternatively performing communication with the first radio. Also, the directivity information storage unit stores the driving directivity information that corresponds to the plurality of second radios and is applied to the directional antenna of the first radio in relation to wireless communication between the first radio and the plurality of second radios in accordance with the plurality of driving patterns in a state in which driving of the one or more driving devices is controlled by the control apparatus in accordance with the plurality of driving patterns. Moreover, the execution unit selects, from among the pieces of the driving directivity information stored in the directivity information storage unit, target driving directivity information that corresponds to the target driving pattern acquired by the acquisition unit and corresponds to the plurality of second radios, and executes wireless communication between the first radio and the plurality of second radios in accordance with the selected target driving directivity information. That is, in this first aspect, when the first radio wirelessly communicates with the plurality of second radios, the target driving directivity information is applied to the directional antenna in accordance with the wireless communication between radios. Accordingly, wireless communication between radios can be made suitable.

Next, as a second aspect, a second radio group including the plurality of second radios is configured to be capable of performing communication with the first radio. The directivity information storage unit stores the driving directivity information that corresponds to the second radio group and is applied to the directional antenna of the first radio in relation to wireless communication between the first radio and the second radio group in accordance with the plurality of driving patterns in a state in which driving of the one or more driving devices is controlled by the control apparatus in accordance with the plurality of driving patterns. Moreover, the execution unit selects, from among pieces of the driving directivity information stored in the directivity information storage unit, target directivity information that corresponds to the target driving pattern acquired by the acquisition unit and corresponds to the second radio group, and executes wireless communication between the first radio and the second radio group in accordance with the selected target driving directivity information. Note that in wireless communication with the second radio group, the first radio may alternatively wirelessly communicate with the second radios, or may wirelessly communicate with the plurality of second radios simultaneously. In this second aspect, when the first radio wirelessly communicates with the second radio group constituted by the plurality of second radios, the target driving directivity information is applied to the directional antenna in accordance with the wireless communication with the second radio group. That is, in the wireless communication with the second radio group, the target driving directivity information that is applied to the directional antenna serves as shared directivity information. Therefore, when the first radio wirelessly communicates with the plurality of second radios, it is not necessary to modify the directivity information that is applied in accordance with the wireless communication with each of the second radios, and it is possible to achieve suitable wireless communication between radios with simple control.

Here, in the above-described wireless communication control system, the second radio may be a sensor-equipped radio including a sensor that measures a predetermined environmental parameter. In this case, the invention of this application achieves suitable wireless communication for transferring measurement data measured by the sensor of the second radio to the first radio.

Also, the present invention has an aspect of a wireless communication control apparatus. That is, the present invention is a wireless communication control apparatus that controls wireless communication performed by a first radio configured to be capable of performing wireless communication with a second radio via a directional antenna in a predetermined environment in which driving of one or more driving devices is controlled by a control apparatus in accordance with a plurality of predetermined driving patterns, the wireless communication control apparatus including a directivity information storage unit that stores driving directivity information relating to a directivity, the driving directivity information being applied to the directional antenna of the first radio in relation to wireless communication between the first radio and the second radio in accordance with the plurality of driving patterns in a state in which driving of the one or more driving devices is controlled by the control apparatus in accordance with the plurality of driving patterns, an acquisition unit that acquires, from the control apparatus, a target driving pattern that is the driving pattern among the plurality of driving patterns that the control apparatus applies to the one or more driving devices, and an execution unit that selects, from among pieces of the driving directivity information stored in the directivity information storage unit, target driving directivity information corresponding to the target driving pattern acquired by the acquisition unit, applies the selected target driving directivity information to the directional antenna of the first radio, and executes wireless communication between the first radio and the second radio. Accordingly, it is possible to suppress the influence of fading between radios as much as possible and suitably perform wireless communication between radios. Note that the technical idea of the invention of this application disclosed in relation to the above-described wireless communication control system can also be applied to the wireless communication control apparatus as long as no technical discrepancy arises. Also, a configuration may be adopted in which the above-described wireless communication control apparatus is included in the first radio.

Here, the present invention also has an aspect of a method for controlling wireless communication. That is, the present invention is a method for controlling wireless communication that controls wireless communication performed by a first radio configured to be capable of performing wireless communication with a second radio via a directional antenna in a predetermined environment in which driving of one or more driving devices is controlled by a control apparatus in accordance with a plurality of predetermined driving patterns, the method including an acquisition step of acquiring, from among the plurality of driving patterns, a target driving pattern that is the driving pattern that the control apparatus applies to the one or more driving devices, a selection step of selecting, from among pieces of driving directivity information relating to a directivity, target driving directivity information corresponding to the target driving pattern acquired in the acquisition step, the target driving directivity information being applied to the directional antenna of the first radio in relation to wireless communication between the first radio and the second radio in accordance with the plurality of driving patterns in a state in which driving of the one or more driving devices is controlled by the control apparatus in accordance with the plurality of driving patterns, and an execution step of applying the target driving directivity information selected in the selection step to the directional antenna of the first radio and executing wireless communication between the first radio and the second radio. Accordingly, it is possible to suppress the influence of fading between radios as much as possible and suitably perform wireless communication between radios. Note that the technical idea of the invention of this application disclosed in relation to the above-described wireless communication control system can also be applied to the wireless communication control method as long as no technical discrepancy arises.

Furthermore, the invention of this application also has an aspect of a method for producing directivity information. That is, the present invention is a directivity information production method for producing directivity information that is applied to a directional antenna in wireless communication control performed by a first radio configured to be capable of performing wireless communication with a second radio via the directional antenna in a predetermined environment in which driving of one or more driving devices is controlled by a control apparatus in accordance with a plurality of predetermined driving patterns. This method includes a test radio wave transmission step of transmitting test radio waves at a plurality of control times that are set in an execution period during which a driving pattern is executed, from a transmission radio to a reception radio out of the first radio and the second radio, in a state in which driving of the one or more driving devices is controlled by the control apparatus in accordance with the plurality of driving patterns, a received signal intensity measurement step of measuring a received signal intensity for the test radio waves when the reception radio receives the test radio waves transmitted from the transmission radio in the test radio wave transmission step, and a production step of producing driving directivity information relating to a directivity in accordance with the plurality of driving patterns, the driving directivity information being applied to the directional antenna of the first radio in relation to wireless communication between the first radio and the second radio in a state in which driving of the one or more driving devices is controlled by the control apparatus in accordance with the plurality of driving patterns such that a received signal measured at the plurality of control times in the received signal intensity measurement step has a maximum intensity or is in a predetermined received signal intensity range. Accordingly, it is possible to suppress the influence of fading between radios as much as possible and produce directivity information for achieving suitable wireless communication between radios.

Effects of the Invention

In a wireless communication control system, it is possible to provide technology for suppressing the influence of fading between radios as much as possible while utilizing a directional antenna, and suitably performing wireless communication between radios.

EMBODIMENTS OF THE INVENTION

A wireless communication control system (hereinafter, also referred to as simply "system" in some cases) 10 according to the present invention, as well as a radio 1 and radios 2a and 2b included in this system will be described with reference to the drawings. Note that the configuration of the following embodiment is merely an example, and the present invention is not limited to the configuration of this embodiment.

Figure 1:
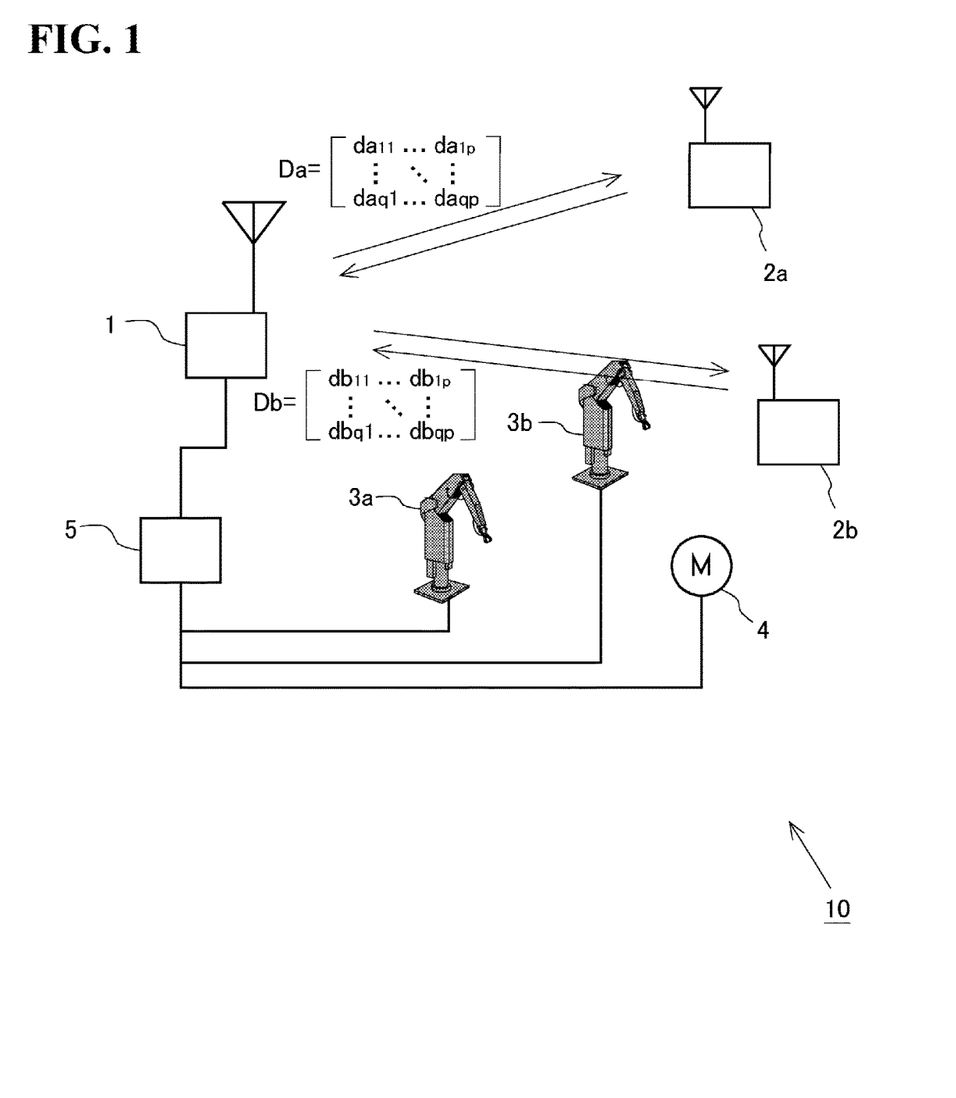
FIG. 1 is a diagram showing a schematic configuration of a wireless communication control system according to the present invention.

FIG. 1 is a diagram showing a schematic configuration of the system 10 used in the field of FA (factory automation) in a factory or the like, and the arrangement of robots 3a and 3b and a motor 4 whose driving is controlled by a control apparatus 5 included therein. Specifically, the system 10 includes the control apparatus 5 such as a PLC (programmable logic controller), and the driving of the robots 3a and 3b and the motor 4 is controlled by this control apparatus 5 in accordance with a predetermined driving pattern. Note that control of the driving of the robot 3a and the like by the control apparatus 5 is conventional technology, and is not central to the invention of this application, and thus specific description thereof is omitted.

Here, the radio 1 is electrically connected to the control apparatus 5 with a cable. Note that connection between the control apparatus 5 and the radio 1 may be realized wirelessly. This radio 1 has a phased-array antenna, which is a directional antenna. The phased-array antenna is an antenna according to a conventional technique, and briefly speaking, it has a directivity control function that can change the direction of transmitting radio waves or conversely increase the sensitivity of reception of radio waves in a specific direction by slightly changing the phase of a signal that is applied to the antenna elements of the antenna array. Therefore, the phased-array antenna of the radio 1 is an antenna that can more sensitively execute the transmission of radio waves in a specific direction and the reception of radio waves in a specific direction compared to other directions, and that can arbitrarily control this specific direction. In the invention of this application, control in this specific direction in the phased-array antenna is referred to as "directivity control in the phased antenna".

By controlling the directivity of the phased-array antenna in this manner, the radio 1 having the phased-array antenna can efficiently deliver radio waves to a partner radio that performs wireless communication in a factory in which the system 10 is disposed, and can efficiently receive radio waves from the partner radio. In this working example, a radio 2a and a radio 2b are disposed in the system 10 as the radios that serve as the partners of the radio 1. The radio 2a and the radio 2b are disposed at different positions, and each have an omnidirectional antenna. Thus, when the radio 2a and the radio 2b wirelessly communicate with the above-described radio 1, wireless communication therebetween is in a suitable state, for example the intensity of a signal received by a reception antenna is higher than a predetermined threshold, due to independently controlling the directivity of the phased-array antenna of the radio 1 in wireless communication with the radio 2a and wireless communication with the radio 2b. Note that in FIG. 1, the directivity of the phased-array antenna is represented by Da in the case where the radio 1 wirelessly communicates with the radio 2a, the directivity of the phased-array antenna in the case where the radio 1 wirelessly communicates with the radio 2b is represented by Db, and the phased-array antenna can modify the directivity with respect to any two-dimensional direction.

Also, the radios 2a and 2b are each provided with a sensor for measuring outside environment parameters (temperature, humidity, acceleration, and the like). Information measured by the provided sensors (measurement information) is transmitted from the radios 2 to the radio 1, is collected in the radio 1, and is subjected to predetermined processing in the control apparatus 5. Here, examples of the sensors provided in the radios 2a and 2b include physical system sensors such as a magnetic sensor, a photoelectronic sensor, a temperature sensor, a humidity sensor, an illuminance sensor, a flow sensor, a pressure sensor, a ground temperature sensor, and a particle sensor, and chemical system sensors such as a $CO_2$ sensor, a pH sensor, an EC sensor, and a soil moisture sensor. In the present embodiment, in order to simplify the description, it is assumed that the radios 2a and 2b are provided with only a temperature sensor for measuring the external temperature at positions at which the radios 2a and 2b are disposed.

In the system 10 having such a configuration, in a state in which the driving of the robots 3a and 3b and the motor 4 is controlled by the control apparatus 5 in order to manufacture a product in the factory (hereinafter, also referred to as "pattern driving control state"), information on the temperature measured by the temperature sensors at the positions at which the radios 2a and 2b are installed is transferred to the radio 1 through wireless communication. Also, required control information is transferred from the radio 1 to the radios 2a and 2b in accordance with the states of the radios 2a and 2b.

Also, in the present embodiment, it is assumed that the control apparatus 5 applies the following three driving patterns to the robots 3a and 3b and the motor 4 as predetermined driving patterns. For example, as Driving Pattern 1, the robot 3a is caused to execute a welding operation A1 and the robot 3b is caused to execute a welding operation B1 in a state in which the motor 4 is stopped. Furthermore, as Driving Pattern 2, the robot 3a is caused to execute an operation A2, the robot 3b is caused to execute an operation B2, and the motor 4 is caused to execute an operation C2. Moreover, as Driving Pattern 3, the robot 3b is caused to execute a welding operation B3 and the motor 4 is caused to execute an operation C3 in a state in which the robot 3a is stopped. Note that the types of driving pattern are also disclosed in FIG. 6 that will be described later.

Here, wireless communication between the radio 1 and the radios 2a and 2b can be performed relatively stably due to the directivity of the phased-array antenna of the radio 1 in particular. Thus, it is expected to be able to efficiently transfer the information on the temperature measured by the radios 2a and 2b to the radio 1. On the other hand, in the system 10 placed in the FA environment, the robots 3a and 3b move their arms and the like in accordance with a control instruction given from the control apparatus 5, and the driving of the motor 4 moves an object that is to be driven (for example, a table of a machine tool). Here, bodies of robots 3a and the like and objects to be driven by the motor 4 are made of metal in many cases. If an object having such a metal body moves in the space in which the system 10 is disposed, there is a risk that fading will act on wireless communication between the radio 1 and the radios 2a and 2b, and inhibit stable wireless communication. Even if the radio 1 performs wireless communication utilizing the phased-array antenna, there is a risk that fading caused by the driving of the robot 3a and the like will act on the wireless communication, whereas if fading acts on wireless communication due to the set directivity of the phased-array antenna, there is a possibility that the assumed effect of the directivity cannot be sufficiently enjoyed and the stability of wireless communication will decrease significantly.

Figure 2:
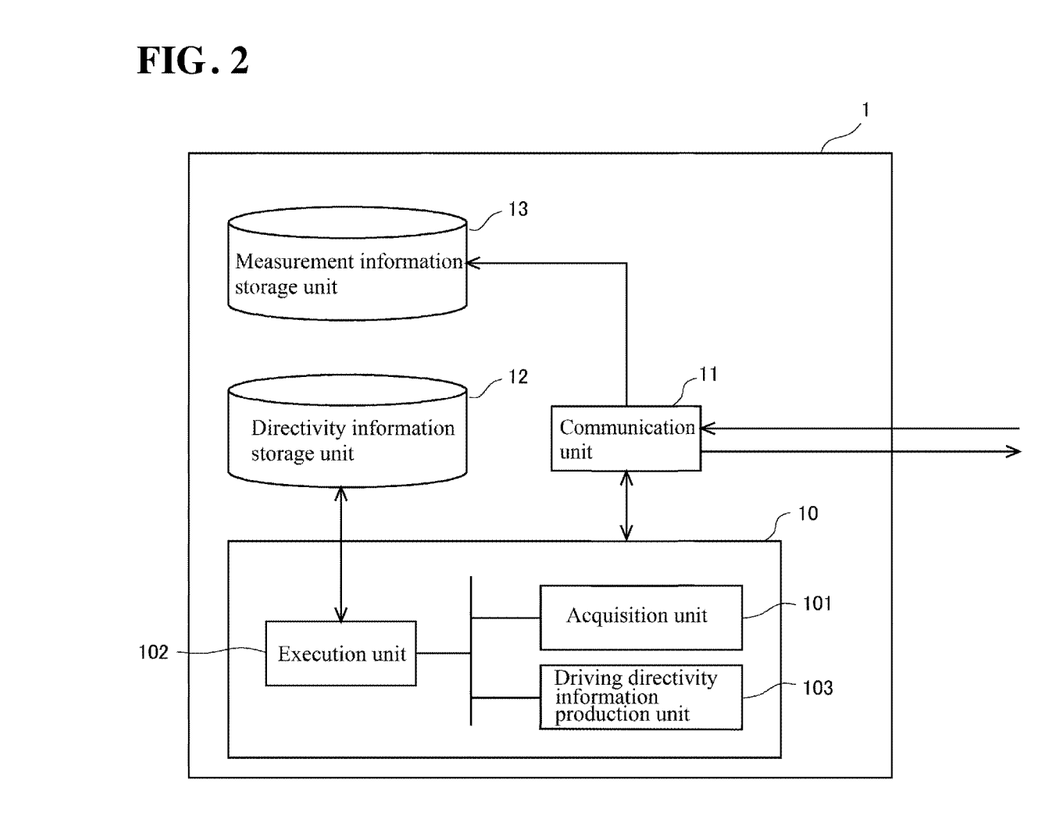
FIG. 2 is a functional block diagram of a radio 1 included in the wireless communication control system shown in FIG. 1.
Figure 3:
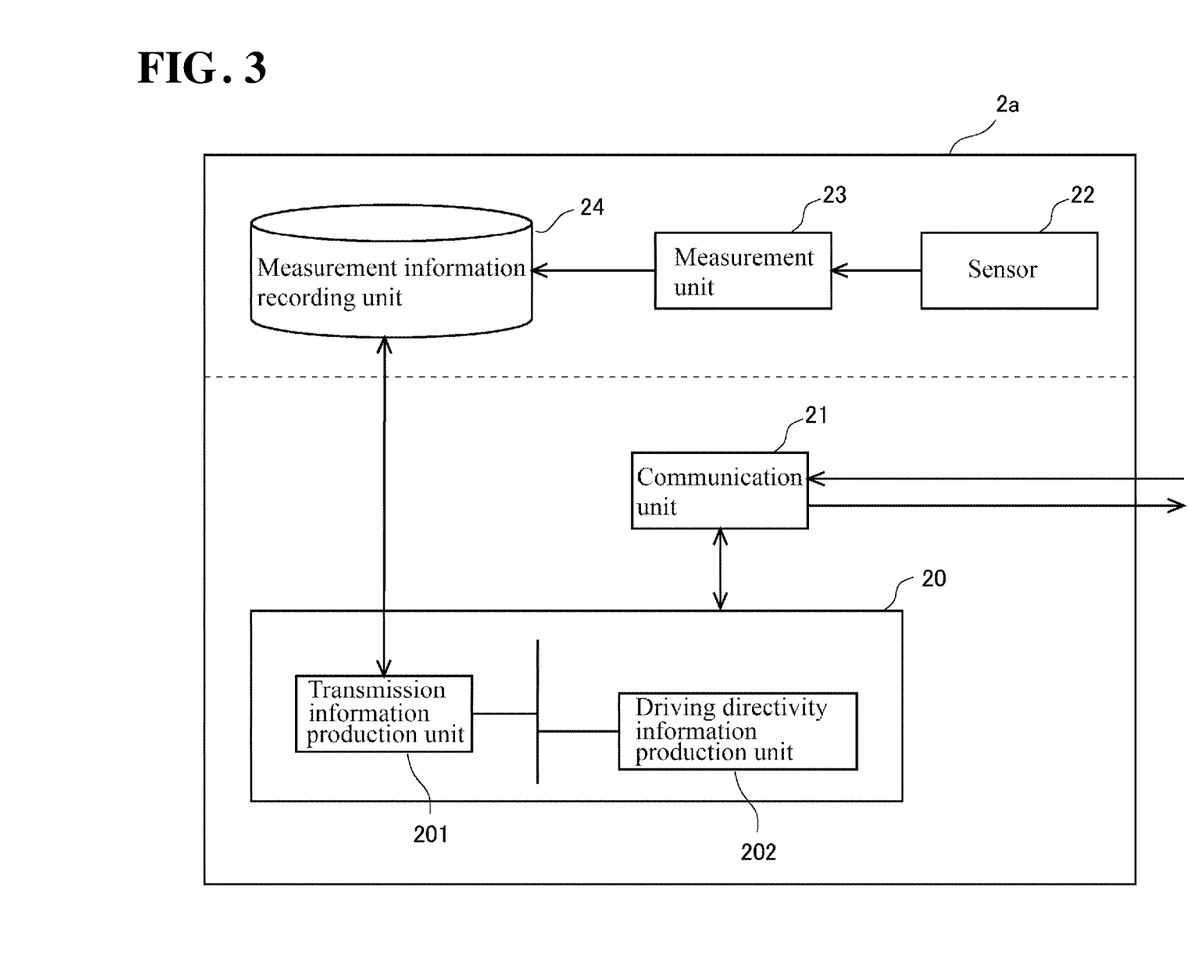
FIG. 3 is a functional block diagram of a radio 2a included in the wireless communication control system shown in FIG. 1.

In view of this, in order to suppress a decrease in the stability of wireless communication between radios due to fading as much as possible, the system 10 according to the invention of this application adopts a configuration in which the directivity of the phased-array antenna of the radio 1 is controlled in accordance with the driving of the robot 3a and the like being controlled by the control apparatus 5, which is the cause of fading. Specifically, the radio 1 and the radios 2a and 2b are configured as shown in FIGS. 2 and 3. The radio 1 and the radios 2a and 2b internally have arithmetic units, memories, and the like, and exhibit not only the wireless communication function but also various functions due to a predetermined control program being executed by these arithmetic units. FIGS. 2 and 3 are functional block diagrams showing an illustration of the functions of the radio 1 and radios 2a and 2b. Note that the radio 2a and the radio 2b have basically the same functions, and thus in this embodiment, FIG. 3 shows a functional block diagram of the radio 2a as a representative example.

First, the radio 1 has a control unit 10, a communication unit 11, a directivity information storage unit 12, and a measurement information storage unit 13 as functional units. Hereinafter, functional units of the radio 1 will be described. The control unit 10 is a functional unit that performs various control in the radio 1, and in particular, has an acquisition unit 101, an execution unit 102, and a driving directivity information production unit 103. The acquisition unit 101 is a functional unit that acquires information relating to the driving pattern that the control apparatus 5 applies to the robot 3a and the like from the control apparatus 5 that is electrically connected to the radio 1. In the present embodiment, as described above, the driving of the robot 3a and the like is controlled in accordance with the three predetermined driving patterns Driving Patterns 1 to 3, and the corresponding pattern driving control states are formed. Note that in addition to the driving pattern, the acquisition unit 101 also acquires information relating to the execution time at which the driving pattern is executed by the control apparatus 5. Examples of the information relating to this execution time include information on the start time at which the execution of the driving pattern is started by the control apparatus 5 and the like.

Also, the execution unit 102 is a functional unit that selects, from the later-described directivity information storage unit 12, driving directivity information that is applied to the phased-array antenna based on the driving pattern acquired by the acquisition unit 101, and executes wireless communication between the radio 1 and the radio 2a and the like after controlling the directivity of this phased-array antenna based on the selected driving directivity information. The driving directivity information is information relating to the directivity set to the phased-array antenna of the radio 1 when the robot 3a and the like is in the pattern driving control state, and determines the directivity of the phased-array antenna so as to suitably realize wireless communication between the radio 1 and the radio 2a and the like even at the time of execution of the driving patterns. Thus, if the acquired driving pattern changes, the execution unit 102 changes the driving directivity information applied to the phased-array antenna in principle. Furthermore, the driving directivity information production unit 103 is a functional unit that produces the driving directivity information that is stored in the directivity information storage unit 12 and used by the execution unit 102, together with the radio 2a and the like, which are the partners for wireless communication. A specific mode of producing this driving directivity information will be described later.

Also, the communication unit 11 is a functional unit that communicates with a device external to the radio 1, that is, transmits and receives information to/from the external device. Specifically, the communication unit 11 is formed so as to interact with the control unit 10. As a result, the communication unit 11 handles reception of information relating to the driving pattern by the acquisition unit 101, wireless communication between radios to which the driving directivity information selected by the execution unit 102 is applied, and wireless communication with an external radio at the time of information production performed by the driving directivity information production unit 103. The directivity information storage unit 12 is a functional unit that stores the driving directivity information applied to the phased-array antenna in the pattern driving control state in the memory, and the measurement information storage unit 13 is a functional unit that stores temperature information in the memory after the communication unit 11 receives the information that was measured by and transferred from the radio 2a or the like that is a communication partner. At the time of transferring this temperature information, the driving directivity information stored in the directivity information storage unit 12 is applied to the phased-array antenna.

Next, the functional units of the radio 2a will be described with reference to FIG. 3. The radio 2a has, as functional units, a control unit 20, a communication unit 21, a measurement unit 23, and a measurement information recording unit 24, and in the case of the present embodiment, the radio 2a is provided with a sensor 22 for measuring a temperature. Hereinafter, functional units of the radio 2a will be described. The control unit 20 is a functional unit that handles various control in the radio 2a, and in particular, has a transmission information production unit 201 and a driving directivity information production unit 202. This transmission information production unit 201 is a functional unit that produces transmission information including the information on the temperature measured by the sensor 2a. Also, the driving directivity information production unit 202 is a functional unit that produces driving directivity information utilized by the execution unit 102 in the radio 1 together with the radio 1 that is a partner of wireless communication.

Next, the communication unit 21 is a functional unit that performs wireless communication with the radio 1. Specifically, the communication unit 21 is formed so as to interact with the control unit 20. As a result, the communication unit 21 handles transfer of the transmission information produced by the transmission information production unit 201, and wireless communication between the radio 1 at the time of production of information produced by the driving directivity information production unit 202, for example. The measurement unit 23 is a functional unit that measures the temperature via the temperature sensor 22 in the environment in which the radio 2a is disposed. Measurement of the temperature by this measurement unit 23 is executed under the instruction of the control unit 20, and the measured temperature information is stored in a memory by the measurement information recording unit 24 at any time. This measurement information recording unit 24 is formed so as to interact with the control unit 20, and the recorded measurement information is passed to the control unit 20 in accordance with an instruction given by the control unit 20, and transmission information is produced by the transmission information production unit 201.

Driving Directivity Information Production Processing

The following describes processing relating to wireless communication between the radio 1 and the radio 2a that have the above configurations, and in particular, wireless communication for transferring information on the temperature measured by the radio 2a to the radio 1. When wireless communication is performed between the radio 1 and the radio 2a, as described above, there is a possibility that the stability of wireless communication will decrease due to the influence of fading caused due to the robot 3a or the like being driven by the control apparatus 5 in accordance with a predetermined driving pattern. Here, in the system 10 according to the invention of this application, focus was placed on the fact that in the driving control performed by the control apparatus 5 in accordance with a driving pattern, the driving of the robot 3a and the like is controlled with predetermined operation content. It can be thought that the influence of fading that is caused due to such driving control performed in accordance with the driving pattern also approximately has reproducibility. In view of this, before the driving of the robot 3a and the like is actually controlled in order to manufacture a product in the factory, the robot 3a and the like are experimentally driven by the control apparatus 5 with the same operational content, and the influence of fading at that time on wireless communication between the radio 1 and the radio 2$a$ is measured. Considering this influence, the driving directivity information, which is the directivity information applied to the phased-array antenna corresponding to the driving pattern, is produced so as to achieve a suitable stable wireless communication state.

Figure 4:
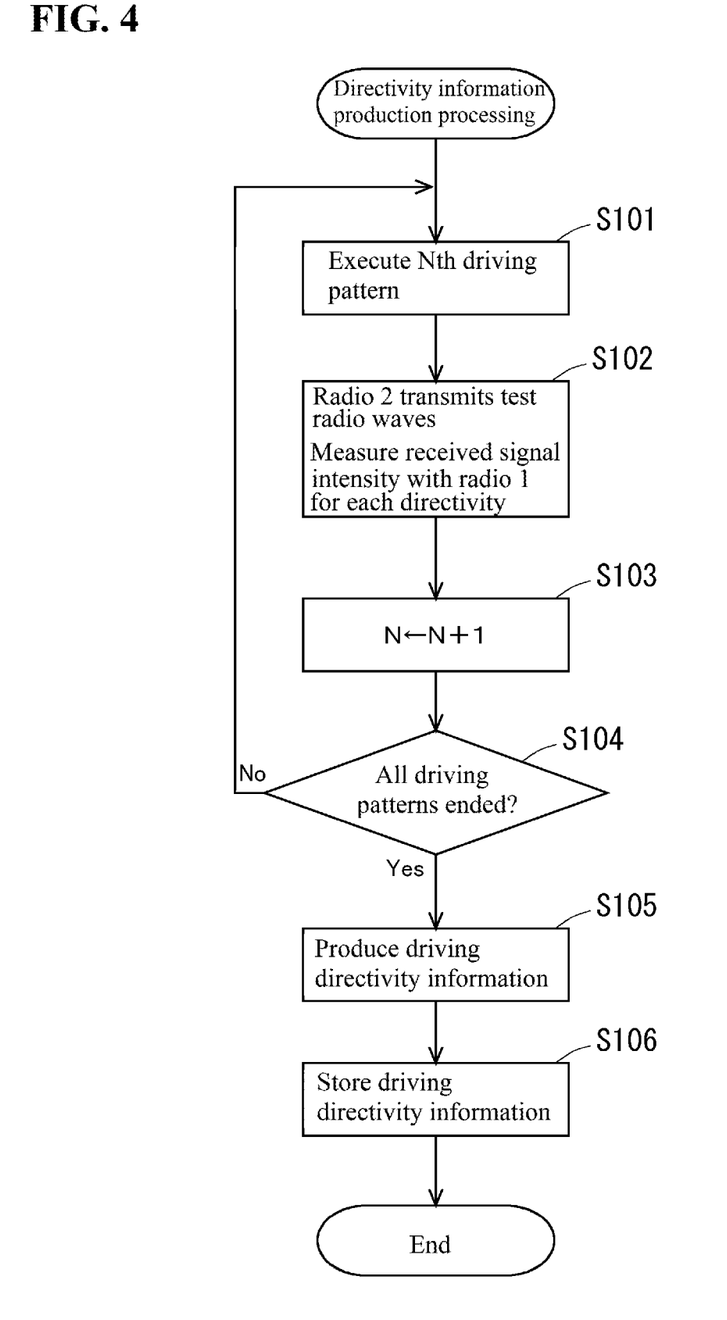
FIG. 4 is a flowchart of processing for producing directivity information, which is performed between the radio 1 and the radio 2a in the wireless communication control system shown in FIG. 1.

The flow of processing for producing this driving directivity information is shown in the flowchart in FIG. 4. This directivity information production processing is executed through cooperation of the driving directivity information production unit 103 of the radio 1 and the driving directivity information production unit 202 of the radio 2$a$. Hereinafter, this directivity information production processing will be described. First, in step S101, in order to produce driving directivity information, the radio 1 requests the control apparatus 5 to successively execute a plurality of driving patterns (three driving patterns Driving Patterns 1 to 3 in the case of the present embodiment) that are executed on the robot 3$a$ and the like. Accordingly, the control apparatus 5 controls the driving of the robot 3$a$ and the like in accordance with the driving patterns in order starting from Driving Pattern 1, and wireless communication between the radio 1 and the radio 2$a$ is in the pattern driving control state in which the driving of the robot 3$a$ and the like is controlled.

Next, in step S102, processing in the radio 2$a$ and processing in the radio 1 are performed in parallel to each other. First, on the radio 2$a$ side, test radio waves are transmitted from the radio 2$a$ to the radio 1 at a plurality of control times in the pattern driving control state relating to an Nth driving pattern. Here, as described later, the control time is the time for controlling the directivity of the phased-array antenna, and the shorter the interval of the control time is, the more carefully the directivity can be controlled. Note that this time interval is a sufficiently short interval with respect to a change in the directivity in the pattern driving control state, that is, an interval short enough to sufficiently understand the effect of fading caused by driving control corresponding to the driving pattern on the directivity.

On the other hand, on the radio 1 side, the received signal intensity for test radio waves transmitted from the radio 2$a$ is measured during a period of executing a driving pattern at this point in time, for each directivity that can be set in the phased-array antenna. Thus, if the directivity of the phased-array antenna can be set in pq ways, on the radio 1 side, the received signal intensity for the test radio waves transmitted from the radio 2$a$ corresponding to the directivity of the pq ways is measured at a predetermined control time. When the processing of step S102 ends, the processing advances to step S103.

In step S103, N indicating which driving pattern is executed to produce the driving directivity information in step S101 is incremented. Then, in step S104, in order to produce the driving directivity information, it is determined whether or not the control of the driving of the robot 3$a$ and the like that is performed by the control apparatus 5 in accordance with all of the driving patterns has ended. If an affirmative determination is made in step S104, the processing advances to step S105, whereas if a negative determination is made, the processing of step S101 onward is repeated again.

Figure 5:
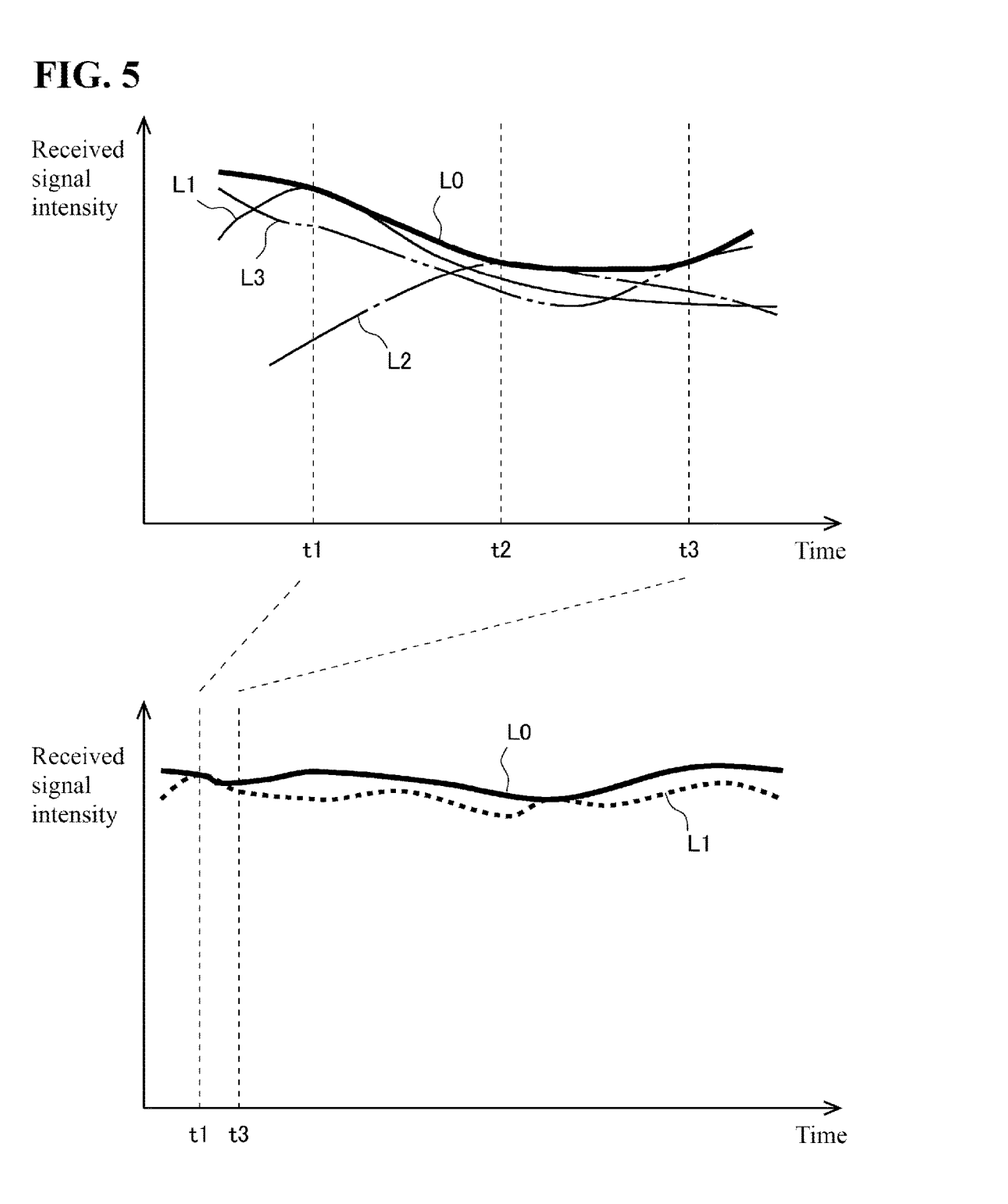
FIG. 5 is a diagram for illustrating a mode for producing directivity information through directivity information production processing shown in FIG. 4.

Then, in step S105, driving directivity information corresponding to the driving patterns is produced based on the received signal intensities measured by the radio 1 in step S102 above. The production of this driving directivity information will be described with reference to FIG. 5. Note that in order to simplify the description, it is assumed that there are three directivities that can be set for the phased-array antenna of the radio 1 in the present embodiment. FIG. 5 shows temporal transition in the received signal intensity measured in step S102 when driving control is performed in accordance with a specific driving pattern (for example, Driving Pattern 1). Specifically, the top of FIG. 5 shows an enlarged view of a partial period (period from a control time t1 to a control time t3) of the bottom, and shows temporal transitions in the received signal intensities corresponding to three directivities set in the phased-array antenna are indicated by L1, L2, and L3.

As shown in FIG. 5, in the present embodiment, the state in which the received signal intensity is always suitably high is not maintained at control times t1, t2, t3 . . . during the execution of Driving Pattern 1 in the case of a specific directivity. This shows that the specific directivity cannot ensure the state in which the received signal intensity is always suitable, due to the influence of fading caused by the execution of Driving Pattern 1. In view of this, in the present embodiment, driving directivity information corresponding to Driving Pattern 1 is produced by selecting, at the control times in the period during which Driving Pattern 1 is performed, the directivity with which the received signal has the maximum intensity, and lining up the selected directivities in time series. For example, in the example of Driving Pattern 1 shown in FIG. 5, the directivity indicated by the line L1 is selected at the control time t1, the directivity indicated by the line L2 is selected at the control time t2, the directivity indicated by the line L3 is selected at the control time t3 is selected, and the directivities with which the received signal has the maximum intensity are successively selected at the control times onward. Then, the selected directivities are lined up in time series, and driving directivity information corresponding to Driving Pattern 1 (that is, information formed in the order of L1 ($t1$), L2 ($t2$), L3 ($t3$) . . . ) is produced. Note that the temporal transition in the received signal intensity according to this driving directivity information is indicated by a line L0 in FIG. 5. The driving directivity information according to this line L0 enables wireless communication in which the influence of fading caused by Driving Pattern 1 is suppressed, by appropriately controlling the directivity of the phased-array antenna at the control times.

Figure 6:
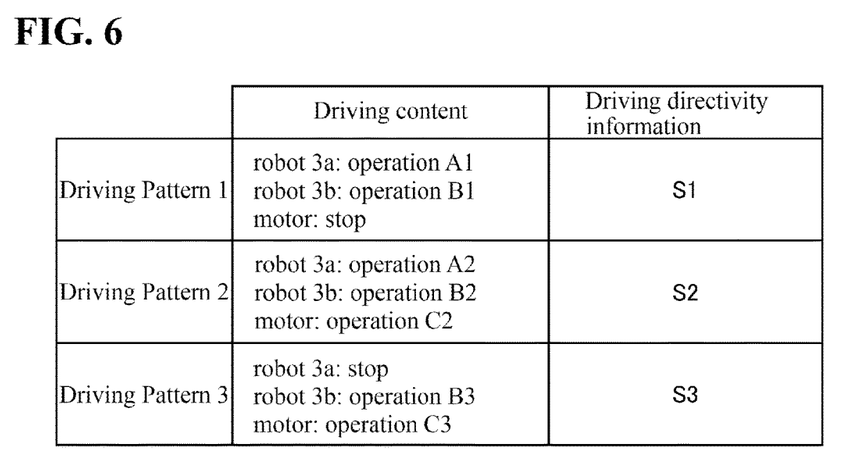
FIG. 6 is a diagram showing a schematic structure of database relating to directivity information provided in the radio 1 included in the wireless communication control system shown in FIG. 1.

The production of this driving directivity information is also similarly performed for remaining Driving Patterns 2 and 3. The driving directivity information that is produced in step S105 and corresponds to the driving patterns is stored in the memory by the directivity information storage unit 12 in step S106. At this time, as shown in FIG. 6, the driving patterns and the corresponding driving directivity information are stored in a state in which they are associated with each other. In the present embodiment, Driving Pattern 1 is associated with the driving directivity information S1 (information that can realize the transition in the received signal intensity indicated by the line L0 in FIG. 5 and in which the directivities at control times are lined up in time series), and Driving Patterns 2 and 3 are respectively associated with the driving directivity information S2 and the driving directivity information S3.

Note that in the production of the driving directivity information in step S105 above, the directivities with which the received signal has the maximum intensity at control times are selected, and are lined up in time series. Instead of this mode, the directivities may be selected at the control times such that the received signal intensity is in a predetermined range in a period during which the driving pattern is executed. Stable wireless communication having little fluctuation in the received signal intensity can be realized between the radio 1 and the radio 2a even through the production of the driving directivity information in this manner.

Also, because the above-described driving directivity information is produced based on test radio waves transmitted from the radio 2a to the radio 1, strictly speaking, the driving directivity information can be suitably utilized when the radio 1 receives information from the radio 2a. However, in many cases, the directivity of the phased-array antenna when information is transferred from the radio 2a to the radio 1 and the directivity of the phased-array antenna when information is transferred from the radio 1 to the radio 2a can be considered to be the same. In view of this, based on this point, the driving directivity information corresponding to the driving patterns obtained through the above-described directivity information production processing may be applied to the phased-array antenna when information is transferred from the radio 1 to the radio 2a.

Driving directivity information applied to the phased-array antenna when information is transferred from the radio 1 to the radio 2a may be produced separately, as another method. In this case, test radio waves are transmitted from the radio 1 to the radio 2a for each directivity of the phased-array antenna in the state in which the driving of the robot 3a and the like is controlled by the control apparatus 5 in accordance with Driving Patterns 1 to 3 in this order, and the received signal intensity at this time is measured by the radio 2a. Then, it is sufficient that information relating to the measured received signal intensity is transferred to the radio 1, and the radio 1 produces and stores driving directivity information by as shown in steps S105 and S106 above.

Also, the relative position of the radio 2b with respect to the radio 1 is different from that of the radio 2a, and thus it is necessary to separately produce driving directivity information for wireless communication between the radio 2b and the radio 1. Note that in this production, the driving directivity information need only be produced substantially similarly to the case of the radio 2a.

Measurement Information Transfer Processing

The radio 1 has driving directivity information produced through the directivity information production processing shown in FIG. 4, and thus the radio 1 and the radio 2a can realize various types of information transfer via wireless communication in the state in which the effect of fading caused by each driving pattern is suppressed in the state in which the driving of the robot 3a and the like is controlled by the control apparatus 5 in accordance with Driving Patterns 1 to 3. In view of this, measurement information transfer processing, which is one aspect of this information transfer, will be described with reference to FIG. 7. This measurement information transfer processing is executed by the radio 1 in order to transfer information on the temperature measured by the radio 2a to the radio 1 via wireless communication.

Figure 7:
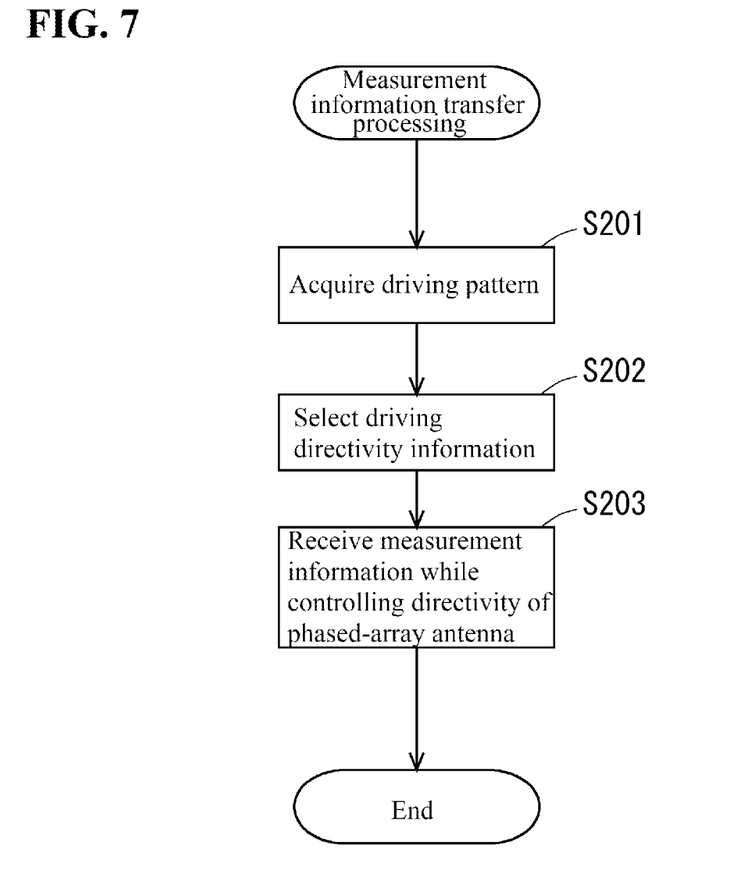
FIG. 7 is a flowchart of processing for transferring measurement information from the radio 2 to the radio 1 in the wireless communication control system shown in FIG. 1.

First, in step S201, the driving pattern executed by the control apparatus 5 at this point in time is acquired by the acquisition unit 101. Thereafter, in step S202, the driving directivity information corresponding to the driving pattern acquired in step S201 is selected from pieces of information stored in the directivity information storage unit 12. For example, when the acquired driving pattern is Driving Pattern 1, the driving directivity information indicated by S1 is selected, when the acquired driving pattern is Driving Pattern 2, the driving directivity information indicated by S2 is selected, and when the acquired driving pattern is Driving Pattern 3, the driving directivity information indicated by S3 is selected.

Then, in step S203, the execution unit 102 applies the directivity information included in this driving directivity information to the phased-array antenna and controls its directivity in the state in which the control time in the selected driving directivity information and the time at which the driving of the robot 3a and the like is controlled by the control apparatus 5 in accordance with the driving pattern coincide with each other. The radio 1 receives information on the temperature from the radio 2a through wireless communication with the radio 2a in the state in which the directivity is controlled.

Note that various known techniques can be utilized for the synchronization of the control time in the radio 1 and the time at which the driving is controlled by the control apparatus 5. For example, a configuration may be adopted in which in the processing of step S201, the acquisition unit 101 acquires a synchronization signal from the radio 1 together with the driving pattern from the control apparatus, and the processing of step S203 is started at time at which the execution of the driving pattern is started in this synchronization signal. Also, as another method, determination may be made such that the processing of step S203 is started at the elapse of a predetermined period of time after the acquisition unit 101 acquires driving pattern from the control apparatus 5. Wireless communication control in the radio 1 that accompanies the above-described control of the directivity information and the driving control of the control apparatus 5 are suitably synchronized due to programming that causes the control apparatus 5 to execute this driving pattern at the elapse of the predetermined period of time.

By performing wireless communication with the radio 2a along with such directivity control, the radio 1 can receive temperature information from the radio 2a and stably collect information in the state in which the radio 1 is not easily influenced by fading caused by the driving pattern performed by the control apparatus 5. Note that transfer of temperature information from the radio 2a is only mentioned in the measurement information transfer processing shown in FIG. 7, but even in the case where information such as control information is transferred from the radio 1 to the radio 2a in the pattern driving control state, the information is suitably transferred to the radio 2a by similarly controlling the directivity of the phased-array antenna in accordance with the driving pattern.

Also, the measurement information transfer processing shown in FIG. 7 is applied to wireless communication between the radio 1 and the radio 2b. Moreover, if the radio 2a and the radio 2b are disposed relatively closely, driving directivity information applied to wireless communication between the radio 1 and the radio 2a and wireless communication between the radio 1 and the radio 2b may be used as shared directivity information. That is, in the radio group constituted by the radio 2a and the radio 2b, if the two radios are close to each other, the relative positions thereof with respect to the radio 1 do not have a large difference in some cases, and the influence of fading between radios can be considered to be the same. In such a case, the load of processing for transferring measurement information can be reduced by making the directivity information applied to the phased-array antenna of the radio 1 shared in wireless communication between the radio 1 and each radio belonging to the radio group. Note that if the shared driving directivity information is applied, wireless communication between the radio 1 and the radio 2a and the wireless communication between the radio 1 and the radio 2b may be performed alternatively or may be performed simultaneously.

Modification

Although the position of the radio 2a does not change in the above-described embodiment, instead of this, the radio 2a may be configured to move by a motor or the like whose driving is controlled by the control apparatus 5 in accordance with a driving pattern. In this mode, the relative position of the radio 2a with respect to the radio 1 is linked with the time axis of the driving pattern by the control apparatus 5. The driving directivity information produced through the above-described directivity information production processing is formed by selecting suitable directivity at predetermined control time in the driving pattern, and thus applying this driving directivity information to the phased-array antenna in such a mode makes it possible to protect wireless communication between the radio 1 and the radio 2a from the influence of fading caused by the driving pattern and to realize suitable wireless communication.

INDEX TO THE REFERENCE NUMERALS

1, 2a, 2b Radio
3 Robot
4 Motor
5 Control apparatus
10 Wireless communication control system (system)

The invention claimed is:

1. A wireless communication control system comprising:
a control apparatus controlling a driving of one or more driving devices in accordance with a plurality of predetermined driving patterns;
a first radio comprising an arithmetic processor and a directional antenna;
a second radio capable of performing wireless communication with the first radio;
wherein the arithmetic processor is configured with a program to perform operations comprising:
operation as a directivity information storage unit that stores driving directivity information relating to a directivity, the driving directivity information being applied to the directional antenna of the first radio in relation to wireless communication between the first radio and the second radio in accordance with the plurality of driving patterns in a state in which driving of the one or more driving devices is controlled by the control apparatus in accordance with the plurality of driving patterns;
operation as an acquisition unit that acquires, from the control apparatus, a target driving pattern that is the driving pattern among the plurality of driving patterns that the control apparatus applies to the one or more driving devices; and
operation as an execution unit that selects, from among pieces of the driving directivity information stored in the directivity information storage unit, target driving directivity information corresponding to the target driving pattern acquired by the acquisition unit, applies the selected target driving directivity information to the directional antenna of the first radio, and executes wireless communication between the first radio and the second radio.

2. The wireless communication control system according to claim 1,
wherein the arithmetic processor is configured with a program to perform operations such that:
operation as the acquisition unit acquires, in addition to the target driving pattern, information relating to an execution time at which the target driving pattern is executed in the one or more driving devices by the control apparatus, and
operation as the execution unit executes wireless communication with the second radio based on the execution time via the directional antenna of the first radio to which the target driving directivity information is applied.

3. The wireless communication control system according to claim 1,
wherein the target driving directivity information comprises information relating to a directivity that is applied to the directional antenna of the first radio, the directivity being set such that a received signal received by a reception radio out of the first radio and the second radio has a maximum intensity or is in a predetermined received signal intensity range at a plurality of control times that are set in an execution period during which the target driving pattern is executed.

4. The wireless communication control system according to claim 1,
wherein the second radio is disposed on a driving device of the one or more driving devices controlled by the control apparatus, and a relative position of the second radio with respect to the first radio changes due to the driving device being moved in accordance with the target driving pattern, and
the target driving directivity information is produced as the relative position of the second radio with respect to the first radio changes.

5. The wireless communication control system according to claim 1,
wherein positions of the first radio and the second radio do not change relative to each other.

6. The wireless communication control system according to claim 1, further comprising:
a plurality of second radios,
wherein the plurality of second radios are each configured to be capable of alternatively performing communication with the first radio, and
the arithmetic processor is configured with a program to perform operations such that:
operation as the directivity information storage unit stores the driving directivity information that corresponds to the plurality of second radios and is applied to the directional antenna of the first radio in relation to wireless communication between the first radio and the plurality of second radios in accordance with the plurality of driving patterns in a state in which driving of the one or more driving devices is controlled by the control apparatus in accordance with the plurality of driving patterns, and
operation as the execution unit selects, from among the pieces of the driving directivity information stored in the directivity information storage unit, target driving directivity information that corresponds to the target driving pattern acquired by the acquisition unit and corresponds to the plurality of second radios, and executes wireless communication between the first radio and the plurality of second radios in accordance with the selected target driving directivity information.

7. The wireless communication control system according to claim 1, further comprising:
a second radio group comprising a plurality of second radios, wherein the second radio group is configured to be capable of performing communication with the first radio as a group, and the arithmetic processor is configured with a program to perform operations such that:

operation as the directivity information storage unit stores the driving directivity information that corresponds to the second radio group and is applied to the directional antenna of the first radio in relation to wireless communication between the first radio and the second radio group in accordance with the plurality of driving patterns in a state in which driving of the one or more driving devices is controlled by the control apparatus in accordance with the plurality of driving patterns, and operation as the execution unit selects, from among the pieces of the driving directivity information stored in the directivity information storage unit, target directivity information that corresponds to the target driving pattern acquired by the acquisition unit and corresponds to the second radio group, and executes wireless communication between the first radio and the second radio group in accordance with the selected target driving directivity information.

8. The wireless communication control system according to claim 1,
wherein the second radio comprises a sensor-equipped radio including a sensor that measures a predetermined environmental parameter.

9. The wireless communication control system according to claim 1,
wherein the directional antenna comprises a phased-array antenna.

10. A wireless communication control apparatus that controls wireless communication performed by a first radio performing wireless communication with a second radio via a directional antenna in a predetermined environment in which driving of one or more driving devices is controlled by a control apparatus in accordance with a plurality of predetermined driving patterns, the wireless communication control apparatus comprising an arithmetic processor configured with a program to perform operations comprising:

operation as a directivity information storage unit that stores driving directivity information relating to a directivity, the driving directivity information being applied to the directional antenna of the first radio in relation to wireless communication between the first radio and the second radio in accordance with the plurality of driving patterns in a state in which driving of the one or more driving devices is controlled by the control apparatus in accordance with the plurality of driving patterns;

operation as an acquisition unit that acquires, from the control apparatus, a target driving pattern that is the driving pattern among the plurality of driving patterns that the control apparatus applies to the one or more driving devices; and operation as an execution unit that selects, from among pieces of the driving directivity information stored in the directivity information storage unit, target driving directivity information corresponding to the target driving pattern acquired by the acquisition unit, applies the selected target driving directivity information to the directional antenna of the first radio, and executes wireless communication between the first radio and the second radio.

11. The wireless communication control apparatus according to claim 10,
wherein the first radio comprises the wireless communication control apparatus.

12. A method for controlling wireless communication that controls wireless communication performed by a first radio performing wireless communication with a second radio via a directional antenna in a predetermined environment in which driving of one or more driving devices is controlled by a control apparatus in accordance with a plurality of predetermined driving patterns, the method comprising:

acquiring, from among the plurality of driving patterns, a target driving pattern that is the driving pattern that the control apparatus applies to the one or more driving devices;

selecting, from among pieces of driving directivity information relating to a directivity, target driving directivity information corresponding to the acquired target driving pattern, the target driving directivity information being applied to the directional antenna of the first radio in relation to wireless communication between the first radio and the second radio in accordance with the plurality of driving patterns in a state in which driving of the one or more driving devices is controlled by the control apparatus in accordance with the plurality of driving patterns; and applying the selected target driving directivity information to the directional antenna of the first radio and executing wireless communication between the first radio and the second radio.

13. A directivity information production method for producing directivity information applied to a directional antenna in wireless communication control performed by a first radio performing wireless communication with a second radio via the directional antenna in a predetermined environment in which driving of one or more driving devices is controlled by a control apparatus in accordance with a plurality of predetermined driving patterns, the method comprising:

transmitting test radio waves at a plurality of control times set in an execution period during which a driving pattern is executed, from a transmission radio to a reception radio out of the first radio and the second radio, in a state in which driving of the one or more driving devices is controlled by the control apparatus in accordance with the plurality of driving patterns;

measuring a received signal intensity for the test radio waves when the reception radio receives the test radio waves transmitted from the transmission radio; and producing driving directivity information relating to a directivity in accordance with the plurality of driving patterns, the driving directivity information being applied to the directional antenna of the first radio in relation to wireless communication between the first radio and the second radio in a state in which driving of the one or more driving devices is controlled by the control apparatus in accordance with the plurality of driving patterns such that a received signal measured at the plurality of control times has a maximum intensity or is in a predetermined received signal intensity range.

* * * * *